United States Patent [19]
Peterson et al.

[11] 3,747,723
[45] July 24, 1973

[54] SELF POSITIONING SEAT

[75] Inventors: Wayne L. Peterson, Woodridge; David L. Blinne, Naperville; Robert W. Sanderson, III, Lombard, all of Ill.

[73] Assignee: International Harvester Company, Chicago, Ill.

[22] Filed: Dec. 29, 1971

[21] Appl. No.: 213,628

[52] U.S. Cl............... 180/77 S, 248/425, 296/65 R, 297/349
[51] Int. Cl............................................ B60n 1/02
[58] Field of Search .................... 180/77 S; 296/63, 296/65 R; 297/240, 349; 248/416, 417, 425; 182/2

[56] References Cited
UNITED STATES PATENTS

| | | | |
|---|---|---|---|
| 3,542,424 | 11/1970 | Bingley et al. | 297/349 |
| 3,233,765 | 2/1966 | Barnes | 180/77 S X |
| 3,159,240 | 12/1964 | Miller | 182/2 |
| 2,700,411 | 1/1955 | Lamb | 296/65 R X |
| 2,845,990 | 8/1958 | Hubert | 248/425 X |
| 3,642,088 | 2/1972 | Smith | 180/77 S |
| 2,617,661 | 11/1952 | Kucera | 180/77 S X |
| 2,650,647 | 9/1953 | MacKnight | 297/349 X |
| 3,398,984 | 8/1968 | Ajero | 180/77 S X |

Primary Examiner—Benjamin Hersh
Assistant Examiner—Leslie J. Paperner
Attorney—Floyd B. Harman

[57] ABSTRACT

A self positioning tractor seat assembly includes a seat pivotally mounted on a cantilever shaft which is itself pivotally mounted on one side of the tractor. A cable means is provided which automatically pivots the seat when the cantilever shaft is manually pivoted.

11 Claims, 7 Drawing Figures

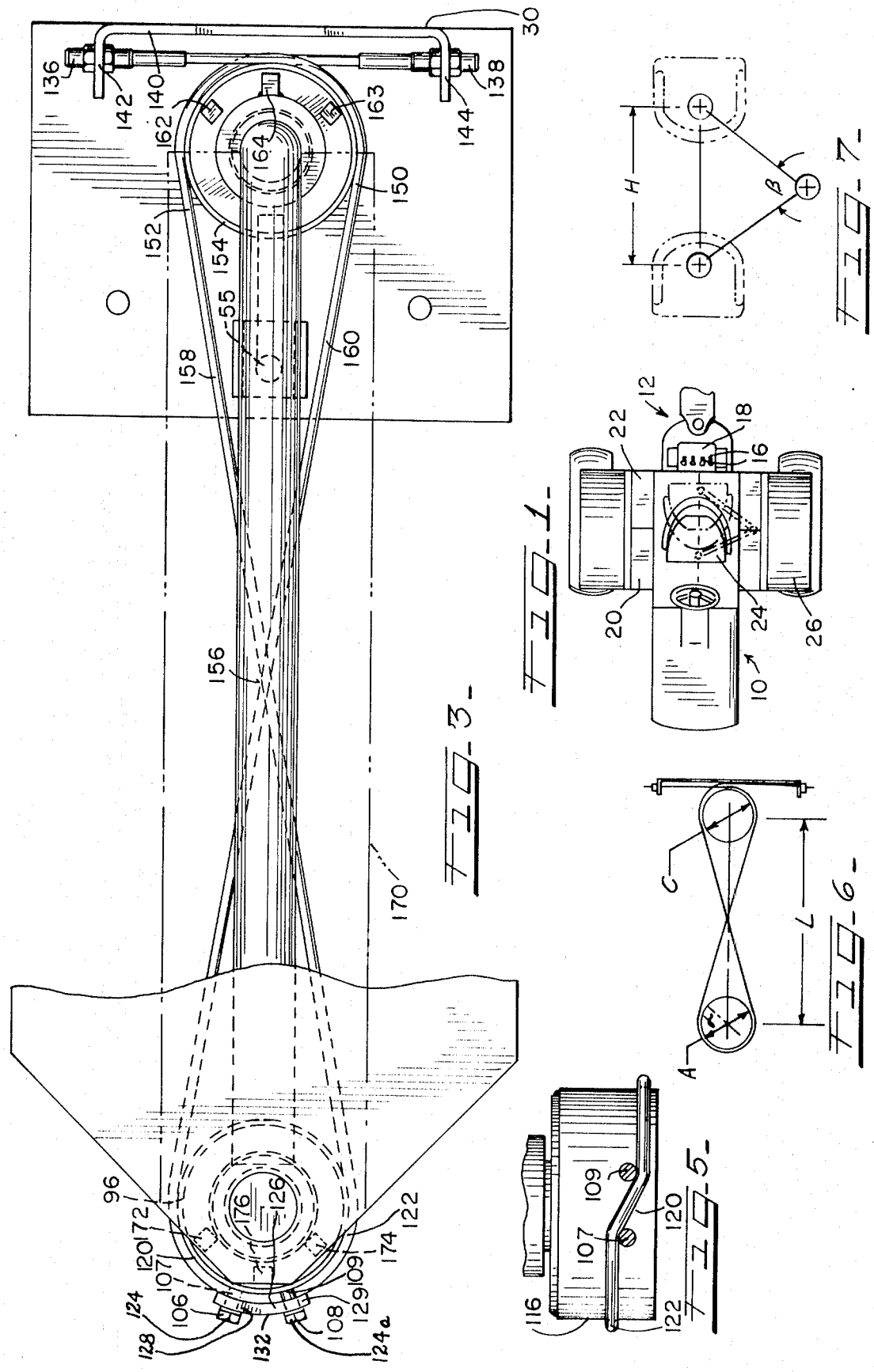

Patented July 24, 1973
3,747,723
2 Sheets-Sheet 2
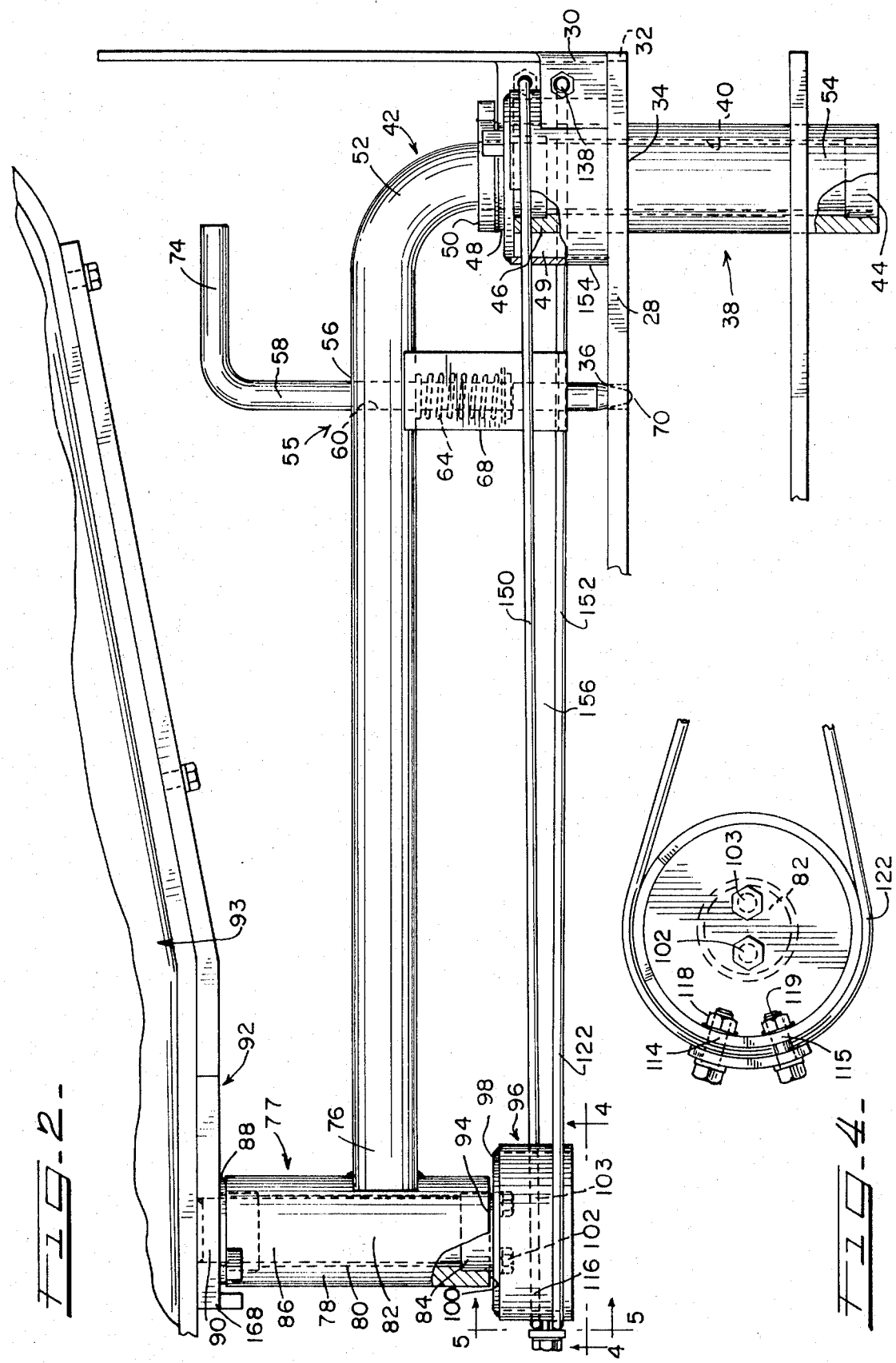

SELF POSITIONING SEAT

BACKGROUND OF THE INVENTION

This invention relates generally to seats and more particularly to seat assemblies designed for use in conjunction with vehicles having a pair of spaced control stations, that is, equipment units that operate from both the front and back. An example is a loader tractor mounted backhoe, wherein it is desirable to use the same seat for driving the loader tractor and also for operating the rear-mounted backhoe.

Previously, seats have been designed which could be pivoted and used either for forward or backward orientated work. Two separate seat systems have been provided on a vehicle, wherein the operator shifts from one to the other to face in the desired direction. However, it is often difficult for a pivot seat to operate when the surrounding space is taken up by equipment and such. An additional factor to be considered is the desire to have the entire back part of the vehicle exposed for maintainance and repair. That is, a seat which can be pivoted to one side leaving the center deck clear of obstructions would allow quick, easy access to the components located beneath the deck.

It is an object of the present invention to provide a seat assembly adaptable to re-positioning whereby a single seat can be used at a pair of spaced control stations.

Another object of this invention is to provide a tractor seat assembly pivotable such that the center deck of the tractor is clear of obstructions.

Yet another object is to provide a self positioning seat pivoting from one side of the tractor.

Still another object is to provide an automatic positioning means having the function of automatically pivoting the seat as the seat assembly pivots.

These and other objects, features and advantages of the invention will be apparent from the following detailed description of a preferred embodiment of the invention and from the accompanying drawings in which:

FIG. 1 is a view of a tractor/backhoe equipped with the seat assembly embodying the present invention;

FIG. 2 is a fragmentary side view of the preferred embodiment of the self positioning seat according to this invention;

FIG. 3 is a fragmentary top view of the self positioning seat;

FIG. 4 is a top sectional view of the cylindrical member;

FIG. 5 is a side view of the cylindrical member;

FIG. 6 is a diagram of the geometric relationship existing between the member components and FIG. 7 is a diagram showing the geometric relationship between the two positions of the seat assembly.

DESCRIPTION OF THE PREFERRED EMBODIMENT

This invention features a novel and simplified design for an automatic positioning means connected between the seat means or mounting and the vehicle that pivots the seat. The design also provides a means for positioning the entire seat assembly to leave the tractor deck clear of seat mechanisms and obstructions. The seat assembly comprises a support means or cantilevered shaft pivotally mounted on one side of the tractor, a seat means for supporting the operator pivotally mounted at the end of the shaft and a cable which has both of its ends fixed to the tractor frame and runs in a figure eight design between the two pivot points. In effect, as the seat assembly and shaft are pivoted through one angle, tension is changed on the cable, which simultaneously pulls the seat through a second angle. Thus, the operator need only push the seat assembly in one direction, he is not required simultaneously to achieve the rather difficult additional pivot, this being automatically accomplished by the cable.

The equipment illustrated in FIG. 1 comprises a typical tractor 10 having a rear supporting portion 12 on which an earth-working implement such as a backhoe is mounted. The tractor is equipped with conventional controls 16 as is the backhoe represented at 18. The rear deck 20 of the tractor is comprised of plates 22 secured to the frame to protect the underlying equipment, and extend over the entire rear area. According to this invention, the seat assembly 24 is pivotally mounted adjacent to one side 26 of the tractor for movement be-tween a forwardly facing and a rearwardly facing position.

Particular reference is now made to FIGS. 2 and 3. The deck plate 28 is secured removably against the side wall member 30 and 32 and forms a generally right angle. Further, the deck plate is apertured 34 and 36. An elongated cylindrical mounting collar 38 or base member is welded to the deck plate 28 adjacent to the aperture 34 and extends upwardly above the plate and downwardly through the aperture. The central bore 40 of the collar 38 receives a cantilevered support shaft 42 which is pivotally mounted on bearings 44. As its upper end 46 collar 38 is provided with a thrust bearing 48 which is aligned with and adjacent a washer 50 welded to the shaft 42, and a cylincrical sleeve member 49. The washer 50 is welded to the shaft such that vertical loads are distributed between the thrust bearing 48 and the bearings 44. Directly abve the thrust bearing 48 and the shaft curves through a smooth bend at 52 forming an angle of about 90° with the base part 54 of the shaft 42.

A locking means or locking pin assembly 55 is provided at 56. The plunger 58 of the assembly passes through an aperture 60 in the shaft 42; a spring 64 located in a hollow elongated collar 68 yielding holds the plunger 58 in a downward position. As shown in FIG. 2, the end 70 of the plunger is tapered to facilitate penetration into the aperture 36 in the deck plate 28. When the plunger end 70 is so positioned, the shaft is immobilized against any pivotal movement. The plunger 58 is capable of vertical movement out of the aperture by action of the operator on the handle 74. The operator thus, when he desires to pivot the shaft, can, while seated, reach down, raise the plunger out of the aperture and pivot the shaft 42.

At the end 76 of the shaft 42 is a seat support means 77 comprised of an elongated cylindrical mounting collar 78. The central bore 80 of collar 78 receives a pivoting support shaft 82 which pivots in the bore 80 on bearing 84. At its upper end 86 collar 78 carries a thrust bearing 88. The end 90 of shaft 82 which extends out of and above the upper end of the collar 86, has secured thereon a seat mounting member 92. Secured on said mounting member 92 is a seat 93, the bottom of said mounting member 92 contacting and riding on said thrust bearing 88.

As herein described, seat mounting member 92, through shaft 82 and bearings 84, 88 is pivotally relative to shaft 42, while the shaft 42, through bearings 44,48 is pivotally relative to the deck 20. The locking pin 55 is provided for selectively locking the shaft 42 against pivotal movement in a plane horizontal with the deck 20.

At its lower end 94 shaft 82 has fixed thereto a rotating means or open bottom cylindrical member 96. The member 96 is secured to the shaft end 94 which extends out from collar 78, such that the top surface 98 is adjacent to, but not in contact with the bottom end 100 of the collar 78. The cylindrical member 96 thus pivots freely as a unit with the shaft 82. A preferred mode of securing the cylindrical member to the shaft is with bolts 102 and 103. The bolts extend through apertures in the top surface 98 and are threaded into suitable apertures in the shaft 82.

Cylindrical member 96, as shown in FIGS. 3, 4 and 5, mounts two bolts or pins 106 and 108. The bolts pass through aligned apertures 114 and 115 in the side 116 of the member and are secured in the preferred embodiment with nuts 118 and 119.

Passing around the back surface 120 of the member 96 is a cable 122, which runs over the top of the shank 107 of bolt 106 and under the bottom of the shank 109 of bolt 108. Adjacent the cable 122, separating it from the bolt heads is an elongated member or curved plate 126. The apertures 114 and 115 are aligned with holes 128 and 129 in the plate 126, lock washers separating the bolt heads 124 and 124a from that of the front plate surface 132.

In practice, bolt 106 is passed through a washer, through an aperture in curved plate 128 and through an aperture 114 in the cylindrical member 96 for hand tight threaded engagement with a nut 118. The cable 122 is passed over the top of shank 107 and twisted down such that when bolt 108 is positioned in the same manner as was bolt 106, the cable passes beneath the shank part 109. The nuts 118 and 119 are then torqued tight causing the cable to be immobilized in sandwiched fashion between the curved plate 126 and the side 116 of the cylindrical member 96, yet the cable is obviously easily removable.

As shown in FIG. 3 the cable 122 is stretched in a fixed figure 8 configuration around the sleeve member means 49 and rotating means 96 of seat mounting means 77, the ends 136 and 138 thereof being anchored by suitable means on bracket 140. The bracket 140 is fastened to the side wall member 30 of the tractor 10 by a suitable means such as welding or riveting, and has two transversely disposed openings 142 and 144. The openings 142 and 144 are in the same vertical plane, but not in the same horizontal plane, one being located above the other. The horizontal displacement difference allows the cable 122 to be fastened without the upper 150 or lower 152 strands touching in a rubbing manner on the surface 154 of sleeve means 49. Protection against rubbing in the center portion 156 of the 8 configuration, where the cable crosses itself, is provided by the over and under threading around shanks 107 and 109 thus avoiding fraying. It is thus apparent that this manner of threading achieves two purposes, the one being separation of the cable parts to prevent rubbing and two, a simple locking procedure to prevent any slippage of the cable 122 under the curved plate 126. If any slippage of the cable were to occur, then as support shaft 42 was pivoted the resulting change in the cable sections 158 and 160 would be compensated for by slippage under the curved plate 126. In actual practice, the change in cable sections 158 and 160 causes the cable to pull cylindrical member 96 to compensate for the length change. The amount that the cylinder is pulled around corresponds to the pivoting of seat from a front facing to a rearward facing position. Thus, it is seen in FIG. 1 that as the shaft 42 is pivoted from position A to position B, or vice versa, changes in length in cable section 158 and 160 cause the seat to automatically reorientate itself to face in the desired direction.

In order to better control the angle through which the operator can pivot the shaft 42, stops or dogs 162 and 163 are fixed on the upper end of cylinder 46. A corresponding stop or dog 164 is fixed on shaft 42 such that the angle of pivot is thereby fixed. A like pivot limiting means exists at the upper end of cylinder 86 and the bottom 168 of seat mount 92. Dogs or stops 172 and 174 are fixed on cylinder 86 and the corresponding stop 176 is fixed to bottom 168.

A shield 170 of generally elongated rectangu-lar dimensions is secured to the collars pivot points 50 and 77 to provide protection for the cable.

The actual angle through which the seat pivots depends on the angle through which shaft means 42 is pivoted and the relationship between the diameters of cylindrical members 49 and 96. Referring to FIGS. 6 and 7 wherein: H is the horizontal distance traveled by seat 93, $\alpha$ is the degrees of rotation of cylinder 96, with respect to its original position $\beta$ is the degrees of an arc swept out by shaft 42, L is the distance between the centers of cylinders 96 and 49, A is the diameter of cylinder 96, and C is the diameter of cylinder 49. These parameters are related by the formulae: $\beta = \arccos(1 - H^2/2L^2)$ and $A = \beta/\alpha-\beta)C$. It is thus apparent that by the varying of selected parameters it is possible to pivot a centilevelrely mounted seat through any desired angle.

Thus, the single seat is pivotable in either of two positions, as indicated, and leaves the center deck clear of obstructions. In addition the interengagement of the seat assembly mechanism accomplishes two seat orientation movements by one simple physical movement by the operator.

Further, because the seat is positioned substantially at the end of a metal lever arm, there is a degree of float or spring therein due to the flexible nature of, in the preferred embodiment, steel. Thus, the operator is in part insulated against jarring, etc.

Variations in the disclosed structure may be readily resorted to without departure from the spirit and scope of the invention.

What is claimed is:

1. A seat assembly for use on a vehicle having a pair of spaced control stations, comprising:
    a seat means for supporting an operator;
    a support means pivotally mounted at one end to the vehicle and rotatably supporting the seat means at the other end;
    said support means being arranged to be pivotable between a first position in which the seat means is adjacent one of said stations and a second position adjacent the other of said stations; and
    a cable means means operatively connected between the seat means and the vehicle and responsive to manual pivoting of said support means between its first and second positions to rotate the seat the proper distance on said support means so that an operator therein is facing the adjacent control station.

2. The seat assembly of claim 1 wherein: the support means is mounted near one wall of the vehicle.

3. The seat assembly of claim 1 wherein: the support means is a cantilevered shaft.

4. The seat assembly of claim 1 wherein:
said seat means includes a cylindrical member having a diameter A, said member being rotated through an angle $\alpha$;
said support means includes a cylindrical member having a diameter C, said member being rotated through an angle $\beta$; and $$A = \beta/\alpha - \beta C.$$

5. The seat assembly of claim 4 wherein:
said cylindrical members have centers, the distance therebetween being L;
said center of said seat means cylindrical member upon pivoting of said support means moving a distance H; and $$\beta = \text{arc cosine } (1 - H^2/2L^2.)$$

6. The seat assembly of claim 5 wherein: the cable is fixed to the vehicle and extends around the seat means and the support means in a figure 8 configuration.

7. A seat assembly for use on a vehicle having a pair of spaced control stations, comprising:
a support shaft;
means of mounting the support on one side of the vehicle for pivotal movement relative thereto;
a seat;
means of mounting the seat on the support shaft for pivotal movement relative thereto; and
a calbe means having a first and second end stretched around said seat mounting means and said shaft mounting means in a figure 8 configuration and each of said ends being secured to said vehicle.

8. The seat assembly of claim 7 wherein said cable means is removably fixed to said seat mounting means.

9. A seat assembly for use on a vehicle having a deck, a side wall and a pair of spaced control stations comprising:
a base member connected to the deck near a side wall thereof, a centilevered shaft pivotally secured to and having one end extending into said base member, a seat support member pivotally mounted at the other end of said cantilevered shaft, and a seat mounted on said seat support; and
a cable having first and second ends attached to said vehicle at different heights, said cable encompassing said base member and said seat support member in a figure 8 configuration, said cable being removably fixed to said seat mounting means.

10. The seat assembly of claim 9 wherein said seat supporting member comprises: an elongated mounting collar connected to said support shaft, an upwardly and downwardly extending support shaft having a seat mount secured to one end and a pivoting means to the other end.

11. The seat assembly of claim 10 wherein said pivoting means is a cylindrical member having a releasable locking means for securing said cable thereto, said locking means comprising pin means releasably received in said cylindrical member and an elongated plate member.

* * * * *